Dec. 22, 1970 S. MANETTA 3,548,567
TREE FOLDING AND PACKAGING DEVICE
Filed May 28, 1968 2 Sheets-Sheet 1
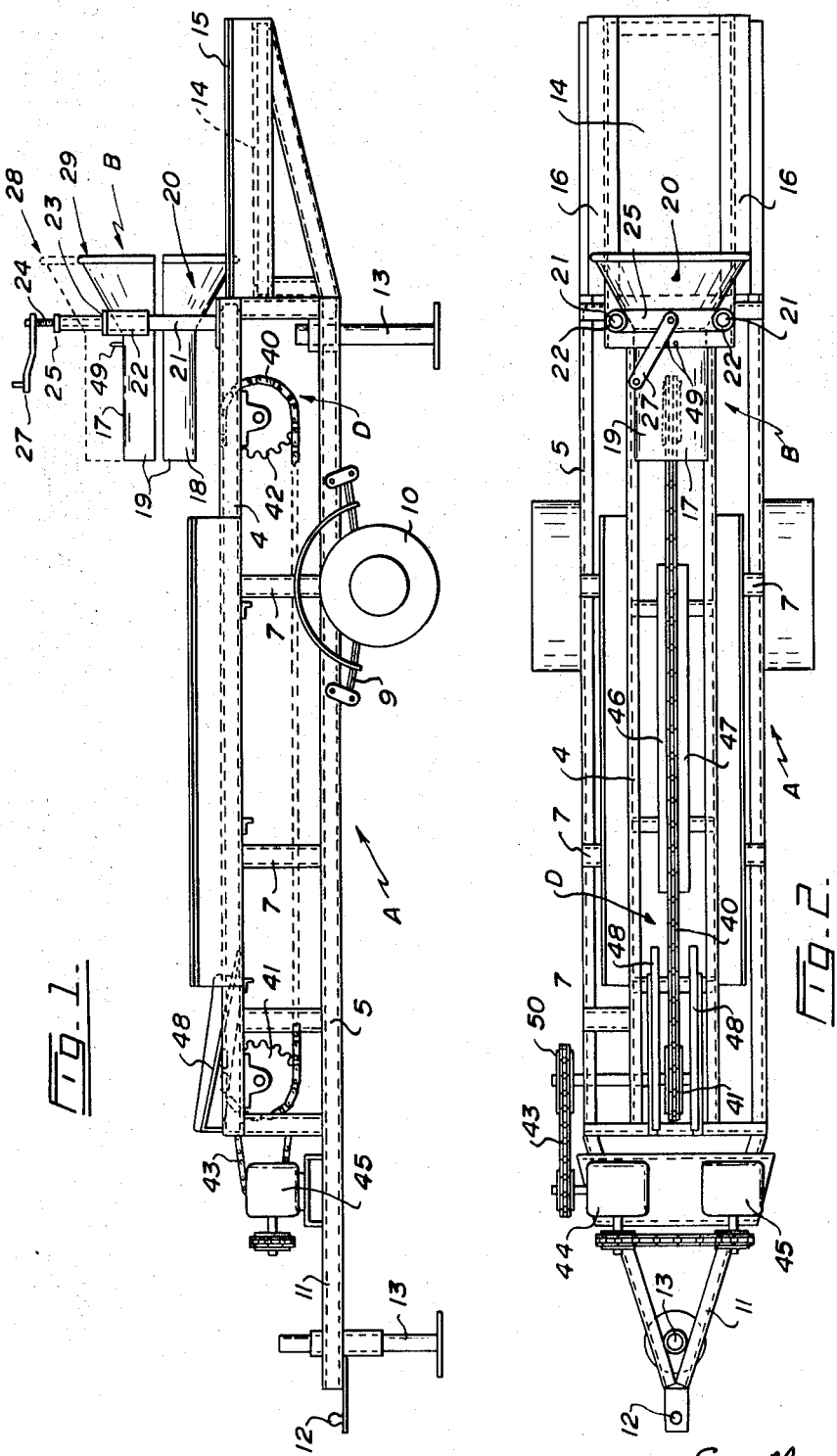
SAM MANETTA
INVENTOR
Hall, Pollock & Vande Sande
ATTORNEYS

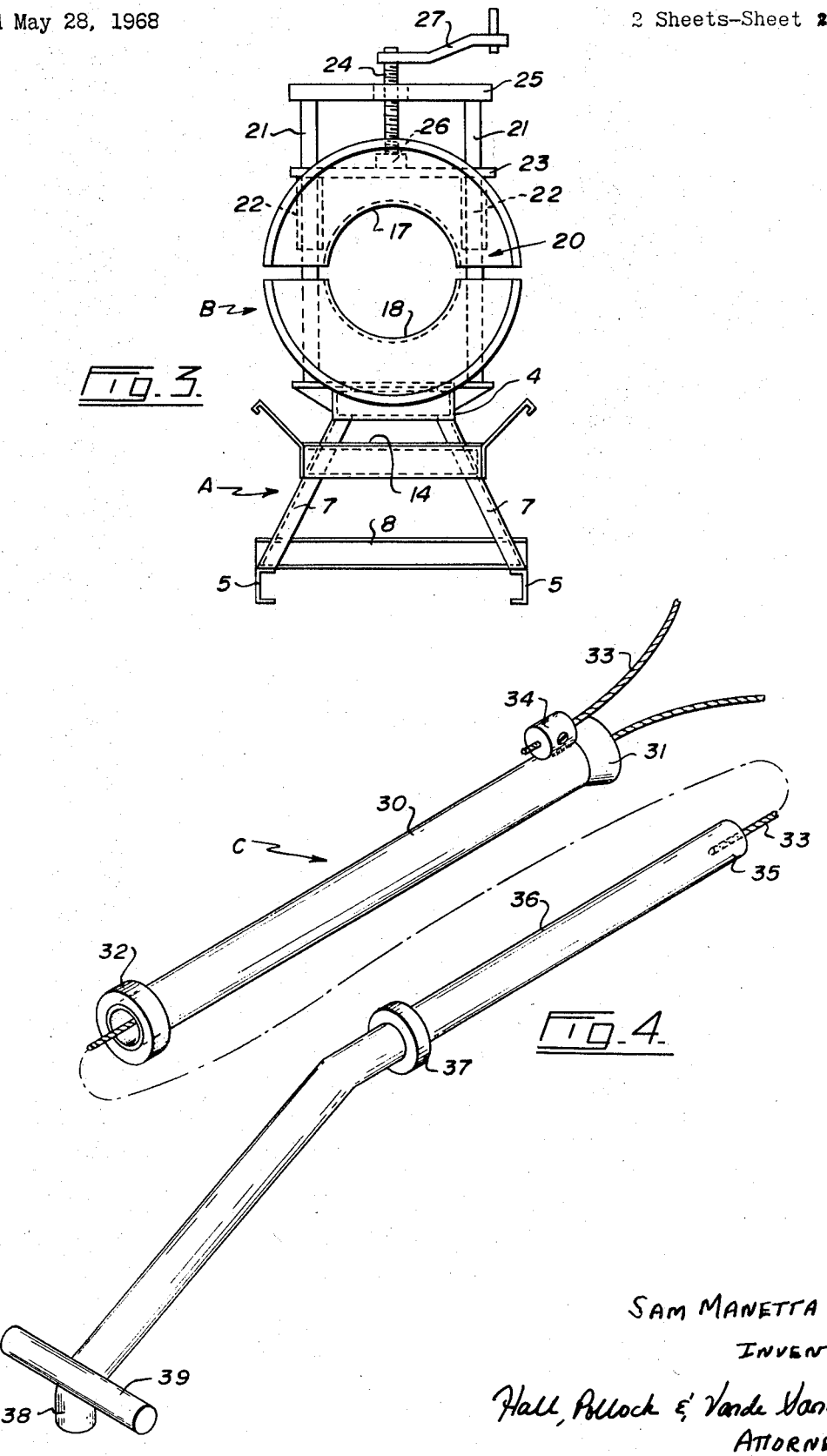

United States Patent Office 3,548,567
Patented Dec. 22, 1970

3,548,567
TREE FOLDING AND PACKAGING DEVICE
Sam Manetta, Box 10, Pontypool, Ontario, Canada
Filed May 28, 1968, Ser. No. 732,773
Claims priority, application Canada, Mar. 22, 1968,
15,638
Int. Cl. B65b 1/20
U.S. Cl. 53—124
2 Claims

ABSTRACT OF THE DISCLOSURE

Tree folding and packaging apparatus having an expandable and contractable cone through which the tree may be pulled to fold the branches, and resilient covering material which is drawn over the tree as it emerges from the cone to cover the tree and contain the branches in folded position.

BACKGROUND OF THE INVENTION

Field of the invention

This invention pertains to folding and packaging, particularly the folding of tree branches and packaging of the trees with the branches in the folded condition and with the folding apparatus adjustable in size to accommodate trees of different sizes.

Description of the prior art

It is common in tree branch folders to provide a cone-shaped device into which a tree may be fitted butt end first so that the tree branches will be gradually folded against the tree trunk as the tree is pulled through the cone.

One such tree branch folder may be seen illustrated and described in prior U.S. Pat. No. 3,358,418 issued Dec. 19, 1967. The device described in this patent includes a cone which has a tubular member at one end with a cylinder of plastic mesh mounted on the tubular member. The plastic mesh is arranged to be drawn over the tree as it emerges from the tubular member and to be severed at the top end of the tree as the tree leaves the tubular member.

One of the problems associated with the tree branch folder of Pat. No. 3,358,418, is that the cone is not adjustable in diameter and, therefore, will not accommodate trees of various size. It therefore becomes necessary to stock a plurality of tree branch folders of different diameters to accommodate trees of various size.

Another problem occurs in fitting the cylinder of plastic mesh over the tubular member of the tree branch folder and withdrawing the plastic mesh from the cylinder when it is fitted on the tubular member. It is desirable for the cylinder to fit snugly on the tubular member so that there will not be any undue movement that would interfere with the withdrawal of the plastic mesh as the tree is being covered. Because of the closeness of diameter of the cylinder and the tubular member to ensure a snug fit, it is difficult to fit the cylinder on the tubular member without damaging the plastic mesh during the installation.

A still further problem exists in the use of conventional tree gripping means to pull a tree through the tree branch folder. Conventional gripping means commonly include a cylindrical open ended grab that may be inserted in the outlet end of the tubular member to engage with and grip the end of a tree trunk that has been inserted in the inlet or cone end of the folder. Difficulty has been encountered in inserting the tree gripping means into the outlet end without damaging the outlet end and/ or the end of the plastic mesh normally overhanging the outlet end.

SUMMARY

The invention herein comprises a tree branch folding device including a hollow cylinder having an inlet end and an outlet end, the inlet end being larger than the outlet end, and the cylinder tapering from the inlet to the outlet end and means acting on the cylinder to vary the diameter of the inlet and outlet end. The ability to increase or decrease the size of the inlet and outlet ends of the tree branch folder enables an operator to adjust the diameter of the inlet and outlet in accordance with the diameter of trees to be folded and permits a more effective folding of the branches without danger of breakage that might occur if a tree branch folder of too small a diameter were used. Further, the adjustment in diameter of the outlet end of the folder permits a user to reduce the diameter of the outlet end so that a cylinder of plastic mesh may be slipped easily on the outlet end without damage to the plastic mesh. The diameter of the outlet then may be increased until the cylinder makes a snug fit as desired. The cylinder may also be fitted over the outlet end of the tree branch folder in much less time than has been possible heretofore and results in an increase in the speed of production of folded and packaged trees.

The improved tree grabbing mechanism is of relatively small size that may be easily inserted into the tubular member, without danger of damage to the plastic mesh, and that may be actuated to grip the tree and then attached to means to pull the tree through the tree branch folder.

In drawings illustrating a preferred embodiment:

FIG. 1 is a side elevation of a tree branch folder mounted in operative position on a framework;

FIG. 2 is a top plan view of the embodiment illustrated in FIG. 1;

FIG. 3 is an end view as seen from the right hand side of FIG. 1;

FIG. 4 is an enlarged detail view of the lasso gripping means.

It will, of course, be understood that only one preferred embodiment is illustrated in the attached drawings and is described in the following description. The invention herein is not to be limited by this preferred embodiment but rather only by the limitations in the appended claims.

As seen in the attached drawings; the invention herein is incorporated in a complete tree packaging device which includes a frame indicated generally at A, a tree branch folder indicated generally at B, tree gripping means indicated generally at C, and tree pulling means indicated generally at D.

The frame A may be of any desired size and shape although the elongated rectangular box like shape illustrated has been found most desirable. The frame is composed of upper longitudinal stringers 4 and lower longitudinal stringers 5 spaced apart by vertically inwardly inclined spacers 7 and upper and lower horizontal spacers 8. The frame A is suitably supported on running gear including springs 9 and wheels 10 and is formed at its forward end into a triangular tongue 11 terminating in a trailer hitch 12. Telescoping legs 13 are provided adjacent the front and rear ends of the framework to maintain the framework in a level position when in use. At its rear end, the frame A is formed into a working surface 14 to support trees being fed into the branch folding mechanism B. Outwardly sloping sides 15 on the stringers 4, 4 and outwardly sloping sides 16 on the work surface 14 guide trees passing along the frame A.

The tree branch folder B is in the form of a funnel composed of complementary sections 17 and 18 which may be positioned together in face to face relationship to define a funnel spout or tubular member indicated generally at 19 with an outwardly flared funnel at one end indicated generally at 20. The sections 17 and 18 are mounted in substantially horizontal position between the pair of uprights 21 fixed rigidly to the framework A to extend upwardly therefrom and joined at their upper ends by the cross piece 25. The lower section 18 is fixed rigidly between the uprights 21 and means are provided to move the upper section 17 with relation to the lower section 18. The means for moving the upper section 17 includes a sleeve 22 mounted slidably on each of the uprights 21 and joined by a cross piece 23. The upper section 17 is fixed rigidly to the cross piece 23 and a threaded bolt 24 contained rotatably in the upper cross piece 25 is engaged threadably with the upright connector 26 on the cross piece 23. In this fashion, rotation of the bolt 24 by the crank 27 will result in movement of the section 17 between the maximum open position indicated at 28 or the maximum closed position indicated at 29 in FIG. 1 in the drawings.

The tree gripping machanism C includes the barrel 30 flared at its one end 31 and provided with an annular flange stop 32 at its opposite end. A tree gripping cable 33 is connected at its one end to the cable locking mechanism 34 and extends at its opposite end into the open flared end 31 of the barrel where it is connected to the one end 35 of the plunger 36. The plunger 36 fits slidably within the barrel 30 and its penetration into the barrel 30 is limited by the annular collar 37 which engages with the flange 32. It will be seen immediately that this will provide a form of noose or lasso that can be tightened on an object by withdrawing the plunger 36 from the barrel 30. At its opposite end, the plunger 36 is formed into a hook 38 which is adapted to engage with the pulling mechanism. A cross piece 39 at the hook 38 is arranged to engage with a wedge to disengage the hook 38 from the pulling mechanism as now will be described.

The pulling mechanism D includes the endless chain 40 operating over the drive sprocket 41 and driven sprocket 42 positioned at opposite end of the framework A. The shaft of the sprocket 41 extends to one side of the frame A with the sprocket 50 fixed to the end of the shaft. The sprocket 50 is linked through a suitable chain or belt drive 43 and a speed reducer 44 to the power source 45 which, in this case, preferably, is a gas engine of suitable size and power mounted on the tongue 11 at the forward end of the framework A. Longitudinal alignment of the endless chain 40 between the sprockets 41 and 42 is ensured by the parallel tracks 46 and 47 between which the chain 40 operates. Positioned at the forward end of the framework A above the drive sprocket 41 are a pair of spaced inclined tracks 48 which engage with the cross piece 39 on the hook 38 to lift the end 38 of the plunger out of engagement with the chain 40 as the chain is operating.

In operation, the apparatus is assembled substantially as illustrated and described and, as in Canadian Pat. No. 726,424 issued Jan. 25, 1966, transparent resilient material in tubular form on a cardboard cylinder is loaded on the spout or tubular member 19 with a suitable retarder ring and retarder ring holding mechanism to restrict the flow of transparent resilient material off the end of the tubular member 19. Spikes 49 projecting up from the tubular member 19 penetrate the cardboard cylinder on which the transparent resilient material is loaded and thereby prevent the cylinder and the resilient material from being accidentally dislodged or pulled off the tubular member 19. The size of the transparent resilient material will, of course, depend on the dimensions of the tree branch folder B which in turn would be adjusted to accommodate the size of tree to be packaged. To ensure that the transparent resilient material fits tightly on the tubular body member 19, and is not damaged during installation, the section 17 is moved toward the section 18 to reduce the diameter of the tubular body member 19, the transparent resilient material in tubular form then is slipped over the end of the member 19 and is engaged on the spikes 49. The member 17 then is moved away from the section 18 to increase the diameter of the tubular member 19 until the transparent resilient material fits tightly thereon.

A tree to be packaged then is inserted butt end first into the open end of the funnel 20. The lasso 33 of the gripping means C is inserted in the end of the body member 19 until the lasso 33 is around the butt end of the tree to be packaged. The plunger 36 is then withdrawn to tighten the lasso 33 on the butt end of the tree and the end 38 is placed in one of the links of the endless chain 40. Operation of the endless chain 40 will pull on the lasso gripping means to pull the tree through the tree branch folder. This will fold the branches against the trunk of the tree and will pull off transparent resilient covering material to cover the tree as described in Canadian Pat. No. 726,424 issued Jan. 25, 1966.

At the opposite end of the machine the cross piece 39 will engage with the wedge 48 and lift the end 38 out of the chain so the lasso may be removed from the butt end of the packaged tree.

It will be obvious that trees to be packaged would be segregated as to size so that a number of trees of the same size could be passed through the tree branch folding mechanism B without adjusting the size of the folding mechanism.

While there is illustrated a tree branch folder comprised of a pair of complementary sections with the lower section fixed and the upper section movable, it will be obvious that mechanism could be provided to move the lower section with relation to a fixed upper section or to move both of the sections to vary the size of the tree branch folder. In addition, while there is illustrated a crank 27 and threaded screw 24 for adjusting the size of the folder, suitable hydraulic or electrically actuated mechanisms could be used for this purpose if desired.

Again, while gripping means including a plunger movable in a barrel with one end of the plunger adapted for attachment to a puller is illustrated, it will be obvious that the plunger could be attached to the puller through a simple chain or cable mechanism to achieve the same result.

For proper functioning of a tree branch folder as described herein, it will be obvious that it is essential to have a hollow cylinder which has an inlet and an outlet end, the inlet end being larger than the outlet end, and the internal diameter of the cylinder must taper from the inlet to the outlet end to ensure gradual folding of branches of a tree pulled therethrough. Means must then be provided to act on the cylinder so that the diameter of the inlet and outlet ends may be varied. Obviously, the diameter of the inlet end will always be adjusted with relation to the diameter of the trees whose branches are to be folded and the diameter of the outlet end will be adjusted to provide a folded tree of the desired diameter. In most cases, the internal diameter of the cylinder throughout its length will be varied at the same time that the diameter of the inlet and outlet ends are varied, although it is conceivable that the diameters of the inlet and outlet ends could be varied independently of each other to vary the taper between the inlet and outlet ends if desired.

Further, while there is illustrated and described a tree branch folder in the form of a circular funnel, it will be obvious that the shape of the folder could vary from oblong to square, hexagonal or any other desired shape. In addition, the shape of the inlet and outlet ends could differ as, for example, the inlet end could be circular in shape while the outlet end could be square or oblong to provide a folded tree in the shape of the outlet end.

Again, while the tree branch folder is shown in the form of a hollow cylinder having substantially rigid sides, it will be obvious that the hollow cylinder could be in the form of a plurality of concentric spaced rings which again could be circular, square or any other desired shape and which would define a hollow cylinder whose function would be the same as the cylindrical funnel illustrated and described, that is to say, it would fold the branches of a tree as a tree is pulled therethrough.

It is to be understood, that when reference is made to a hollow cylinder, I include a cylinder having solid walls or a cylinder formed of a plurality of spaced concentric hoops of any desired shape that can be linked together to define a cylindrical enclosure.

It will be also appreciated that, while there is illustrated and described a folder formed of a pair of complementary sections with means to vary one section with relation to the other, the hollow cylinder in a variety of shapes and constructed in different fashions could be expanded and contracted in size in a number of ways. For example, the cylinder could be constructed with one open side having overlapping edges and with means adapted to compress or enlarge the diameter of the cylinder by increasing or decreasing the overlap of the edges.

Further, while a single grab or tree gripping mechanism C has been illustrated and described, it will be obvious that a tree gripping mechanism incorporating a plurality of lasso loops could be used if desired. In this fashion, the tree branch folder could be opened sufficiently to permit a pair of trees to be pulled therethrough side by side and in this instance a multiple grab having at least two lasso loops would be required to pull on the trunks of each tree to pull them through the tree branch folder.

I claim:
1. A device adapted to fold the branches of a tree pulled therethrough comprising:
a hollow cylinder having an inlet end and an outlet end, the inlet end being larger than the outlet end, and the cylinder tapering from the inlet to the outlet end,
means acting on the cylinder to vary the diameter of the inlet and outlet ends, and lasso gripping means adapted for insertion in the outlet end of the hollow cylinder to grip a tree in the cylinder, such lasso gripping means including an elongated barrel, a plunger adapted for sliding movement in the barrel and to extend from one end of the barrel, a cable secured at its one end to the opposite end of the barrel, and at its opposite end to the other end of the plunger within the barrel and means at the opposite end of the plunger for engagement with pulling means.

2. The device as claimed in claim 1, wherein the pulling means includes an endless chain operating over sprockets, and means driving one of the sprockets to operate the chain.

References Cited

UNITED STATES PATENTS

| | | | |
|---|---|---|---|
| 2,720,055 | 10/1955 | Morris | 53—124(E)X |
| 2,974,457 | 3/1961 | Saxton | 53—124(e)X |
| 3,416,434 | 12/1968 | Woserau et al. | 53—124(E)X |
| 3,473,291 | 9/1969 | Raymond et al. | 53—124(E) |

H. A. KILBY, JR., Primary Examiner